(12) United States Patent
Olgren

(10) Patent No.: US 7,094,156 B2
(45) Date of Patent: Aug. 22, 2006

(54) CONSTANT VELOCITY JOINT

(75) Inventor: Leland Nels Olgren, Frankenmuth, MI (US)

(73) Assignee: Delphi Technologies, Inc., Troy, MI (US)

(*) Notice: Subject to any disclaimer, the term of this patent is extended or adjusted under 35 U.S.C. 154(b) by 227 days.

(21) Appl. No.: 10/310,077

(22) Filed: Dec. 4, 2002

(65) Prior Publication Data

US 2003/0104873 A1 Jun. 5, 2003

Related U.S. Application Data

(60) Provisional application No. 60/336,758, filed on Dec. 4, 2001.

(51) Int. Cl.
*F16D 3/224* (2006.01)

(52) U.S. Cl. ........................... 464/145; 464/906

(58) Field of Classification Search ........ 464/139–146, 464/906, 15; 277/345, 353; 285/270, 264, 285/261
See application file for complete search history.

(56) References Cited

U.S. PATENT DOCUMENTS

| | | | | |
|---|---|---|---|---|
| 2,006,026 | A | * 6/1935 | Midthun | 464/145 |
| 5,368,523 | A | * 11/1994 | Mazziotti | 464/144 |
| 5,857,782 | A | * 1/1999 | Waskiewicz | 384/493 |
| 6,115,863 | A | 9/2000 | Mason et al. | |
| 6,159,103 | A | 12/2000 | Lu | |
| 6,186,899 | B1 | 2/2001 | Thomas et al. | |
| 6,190,260 | B1 | 2/2001 | Flores et al. | |
| 6,206,785 | B1 | 3/2001 | Thomas | |
| 6,264,568 | B1 | * 7/2001 | Frazer et al. | 464/173 |
| 6,390,925 | B1 | 5/2002 | Perrow | |
| 6,443,844 | B1 | 9/2002 | Perrow | |
| 6,468,164 | B1 | 10/2002 | Song | |
| 6,533,667 | B1 | 3/2003 | Perrow et al. | |
| 6,533,668 | B1 | 3/2003 | Mizukoshi et al. | |
| 6,582,313 | B1 | 6/2003 | Perrow | |
| 6,616,537 | B1 | 9/2003 | Thomas et al. | |
| 6,616,538 | B1 | 9/2003 | Perrow | |

* cited by examiner

*Primary Examiner*—Kenneth Thompson
(74) *Attorney, Agent, or Firm*—Michael D. Smith

(57) ABSTRACT

A joint assembly has outer and inner joint members supported for relative angular movement while preventing rotation between the joint members. The outer joint member is fitted with a lip seal device presenting at least one seal lip which dynamically engages and sealingly wipes at least one corresponding sealing surface of the inner joint member at all angles to seal a space for the retention of lubricant and exclusion of contaminants.

14 Claims, 4 Drawing Sheets

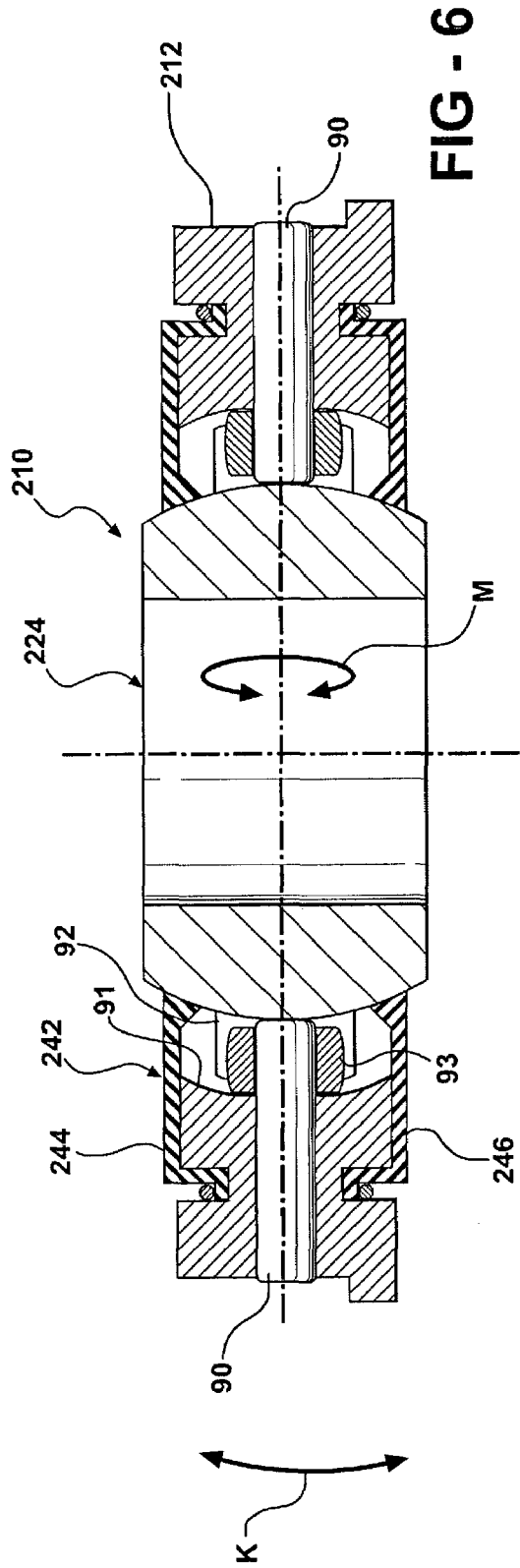
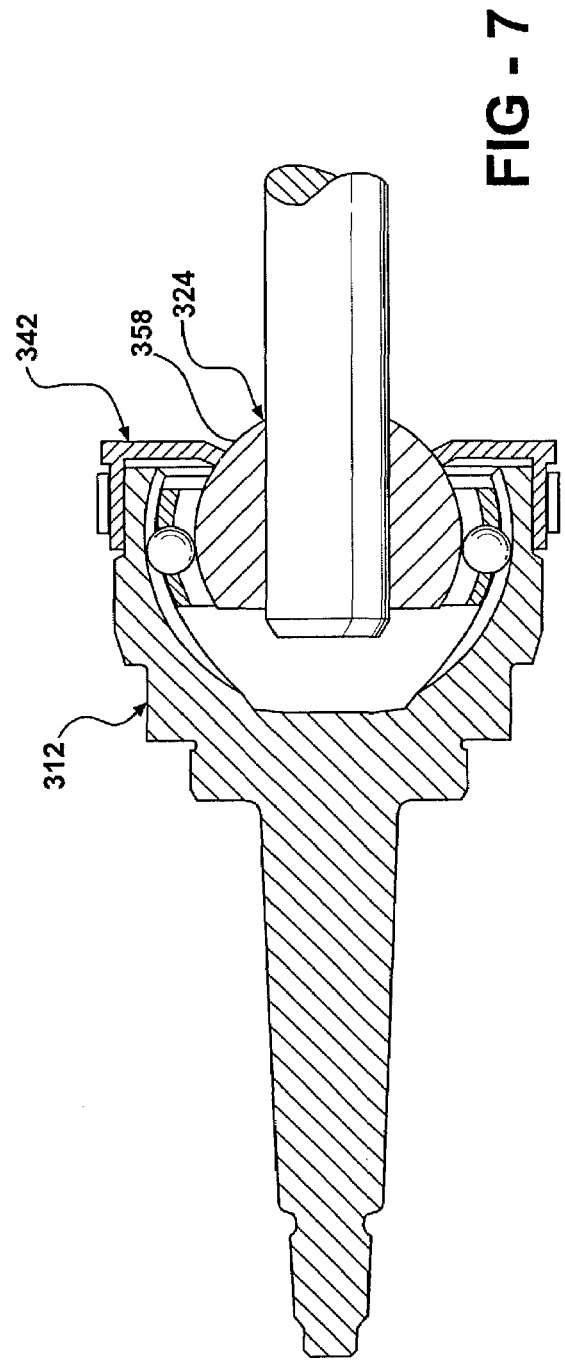

CONSTANT VELOCITY JOINT

This application claims the benefit of U.S. Provisional Application(s) No. 60/336,758, filed Dec. 4, 2001.

TECHNICAL FIELD

This invention relates generally to joint assemblies having inner and outer joint members which angulate and are supported substantially against relative rotation, and more particularly to the means of sealing such joint assemblies.

BACKGROUND OF THE INVENTION

So-called "Rzeppa" constant velocity joint assemblies are known in which an inner joint member is disposed within an outer joint member and the two formed with aligned ball grooves within which are disposed torque-transmitting balls which enable the joint to transmit torque between the members while being supported for relative articulation. Such Rzeppa joints are typically provided with a seal boot in a form of a convoluted sleeve which fits over and shrouds the inner and outer joint members and is clamped at its ends to provide a clean environment to the joint members and to retain lubricant. The convoluted configuration enables the joints to flex with the joint and maintain the sealed environment at high joint angles. One inherent drawback to such seal boots is that they are prone to damage from puncture, wear and/or abrasion. Such damage to the boot can impair its effectiveness at retaining lubricant and excluding contaminants which can shorten the life of the joint.

Another inherent characteristic of such convoluted boot seals is that they enlarge the overall package size of the joint. In applications where such joints are employed, space must be provided to accommodate the added volume of the boot.

SUMMARY OF THE INVENTION

A joint assembly constructed according to the invention includes an outer joint member having a concave inner surface and at least one curved ball groove formed in the inner surface, an inner joint member supported in the outer joint member for relative angular movement and having a convex outer surface formed with at least one ball groove aligned with the at least one ball groove of the outer joint member to provide at least one curved ball track in which at least one corresponding ball is disposed for permitting the relative angular movement while supporting the joint members substantially against rotation. The joint includes a dynamic lip seal device fixed to one of the inner and outer joint members and slideably and sealably engaging the other of the joint members to provide a sealed environment to the at least one ball during the relative angular movement of the joint members.

The invention has the advantage of providing a sealed joint assembly of simple construction.

The invention has the further advantage of providing a seal system for joints which is not prone to puncture, wear or abrasion during operation, as are the aforementioned boot-type seals.

The invention has the further advantage of providing a joint which is more compact than those fitted with a boot-type seal mentioned above.

A joint constructed according to the present invention has particular advantage for use in washing machine applications for supporting the drive of a wobbling wash plate.

BRIEF DESCRIPTION OF THE DRAWINGS

The present invention will now be described, by way of example, with reference to the accompanying drawings, in which:

FIG. 6 is a sectional view of a third embodiment of the invention; and

FIG. 7 is a fragmentary elevation view of a fourth embodiment of the invention.

DESCRIPTION OF THE PREFERRED EMBODIMENT

A fixed center joint assembly constructed according to a first presently preferred embodiment of the invention is shown generally at 10 in FIGS. 1–4.

Figure 3:
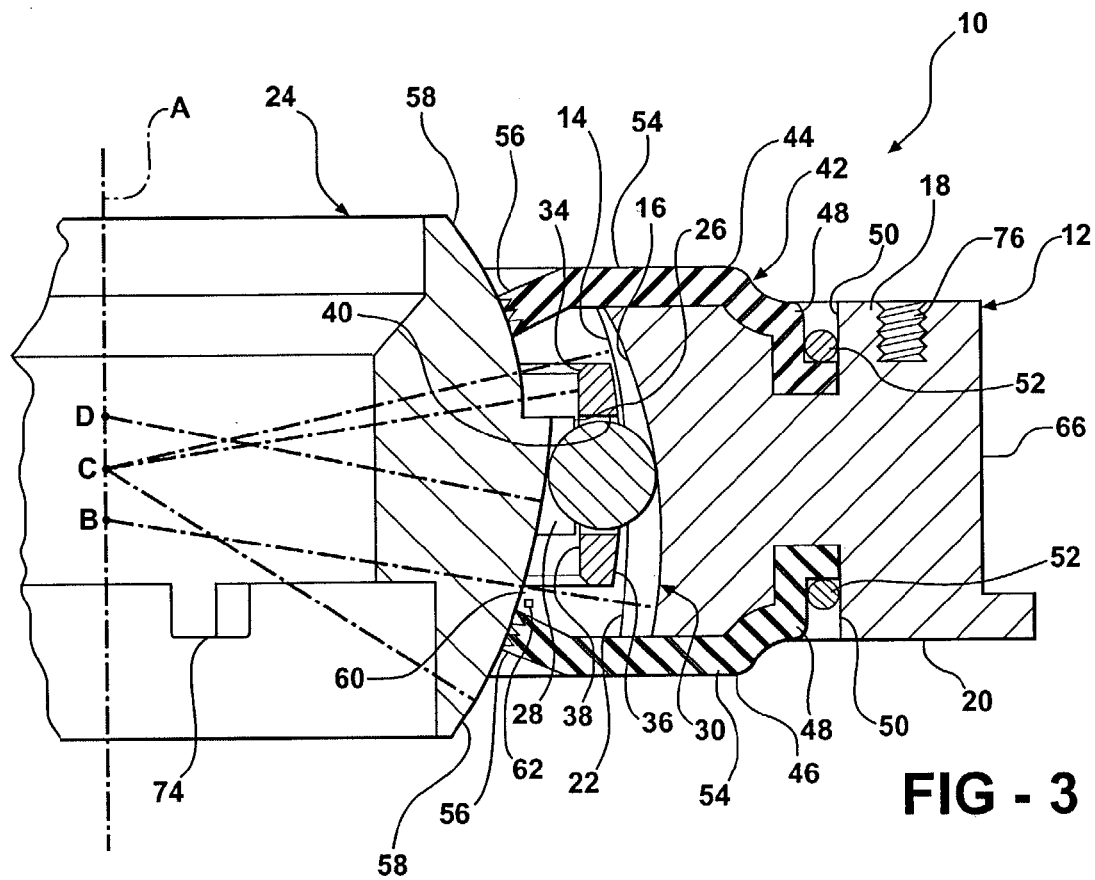
FIG. 3 is an enlarged fragmentary view of FIG. 2.

The joint assembly 10 includes an outer joint member 12 having a concave inner surface 14 which is preferably part-spherical, having a center of curvature C lying along an axis of the outer joint member 12, corresponding to a longitudinal axis A of the joint assembly 10 when the joint assembly 10 is at a 0 degree tilt angle. At least one, and preferably a plurality, of ball grooves 16 are formed in the inner surface 14 of the outer joint member 12 and are curved in the axial direction. The ball grooves 16 have a center of curvature B lying along the axis A of the joint 10, but offset axially from the center of curvature C of the inner surface 14, as best shown in FIG. 3.

The outer joint member 12 is preferably generally cylindrically shaped in its overall configuration and has opposite ends 18,20 which are preferably open, such that the grooves 16 extend between the ends 18,20. The grooves 16 are spaced circumferentially from one another by intervening lands 22 formed between each ball groove 16. The inner surface 14 is formed on the lands 22. The ends 18,20, in the preferred embodiment are generally flat and planar, although other shapes and relative orientations of the ends 18,20 are contemplated within the scope of the invention.

The joint assembly 10 has an inner joint member 24 disposed within the outer joint member 12 in such manner as to provide relative angular movement between the inner and outer joint members 12,24 about a pivot center coinciding with the center of curvature C. Accordingly, C also represents the center of pivot of the joint assembly 10 with respect to the relative angular movement between the inner 24 and outer 12 joint members. The inner joint member 24 has a convex outer surface 26 which is preferably part-spherical in shape and sharing the center of curvature C of the outer joint member 12. The outer surface 26 is formed with at least one and preferably a plurality of curved ball grooves 28. The ball grooves 28 preferably have a center of curvature D with lies along the axis A of the joint and is offset from the center point C on the axially opposite side of the center C is that of point B by an equal amount. The ball grooves 28 are aligned with the ball grooves 16 which, together, form at least one and preferably a corresponding plurality of curved ball tracks 30 in which at least one and preferably a corresponding plurality of balls 32 are disposed.

The balls 32 roll along the surfaces of the ball grooves 16,28 in the direction of their curvature during angulation of the joint members 12,24, and thus permit such angulation of the joint members. However, the balls 32 act as keys in the ball grooves 16,28 by confronting the sides of the grooves to substantially prevent relative rotation of the joint members 12,24 during operation at all angles of the joint assembly 10. Of course, a certain amount of relative rotation is permitted due to manufacturing tolerances within the scope of the meaning of substantial, such that up to about 10° of relative movement may exist. Any torque applied to one of the joint members is thus transmitted through the balls 32 to the other joint member through engagement with the side walls of the ball grooves 16,28.

Figure 2:
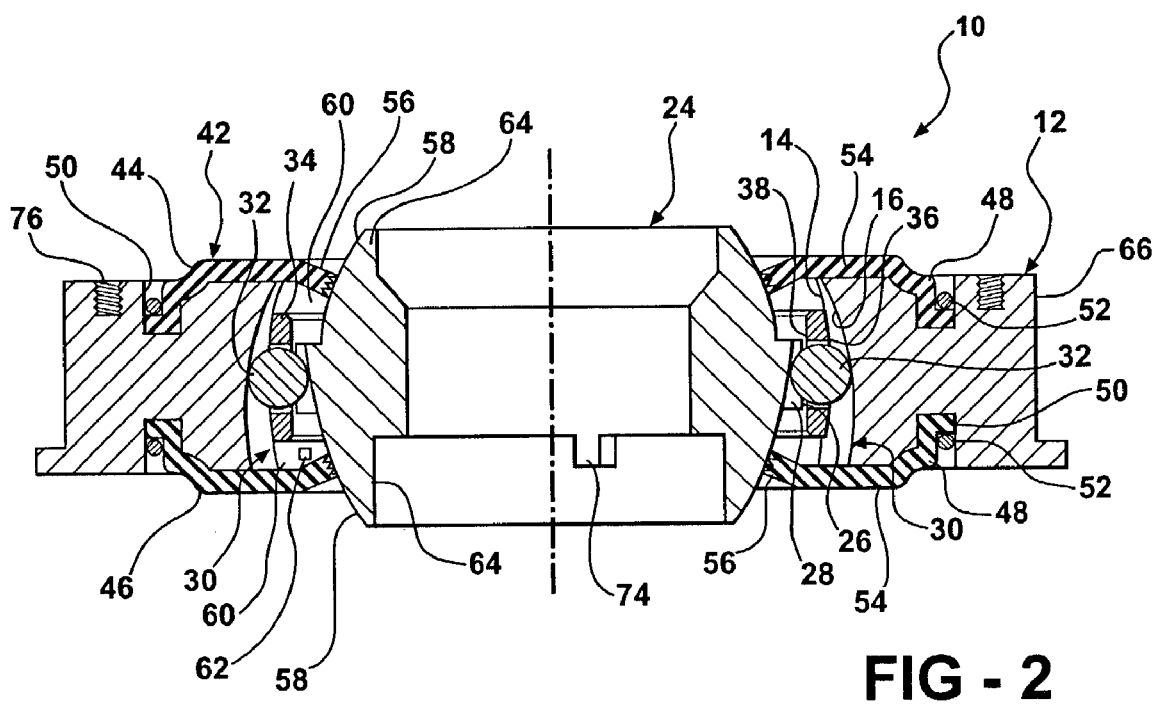
FIG. 2 is a cross-sectional view taken generally along lines 2—2 of FIG. 1.

The joint assembly 10 is preferably fitted with a ball cage 34 which is disposed between the outer and inner joint members 12,24 as illustrated best in FIGS. 2 and 3. The ball cage 34 has outer convex and inner concave surfaces 36,38, respectively, which preferably share the common center of curvature C and engage the respective inner 14 and outer 26 surfaces of the outer and inner joint members 12,24 to provide for the relative angular movement of the joint members 12,24 in all directions about the center of curvature C. The ball cage 34 is provided with at least one and preferably a corresponding plurality of windows 40 in which the balls 32 are accommodated for retaining the balls 32 within the ball tracks 30 at all angles of the joint.

Figure 1:
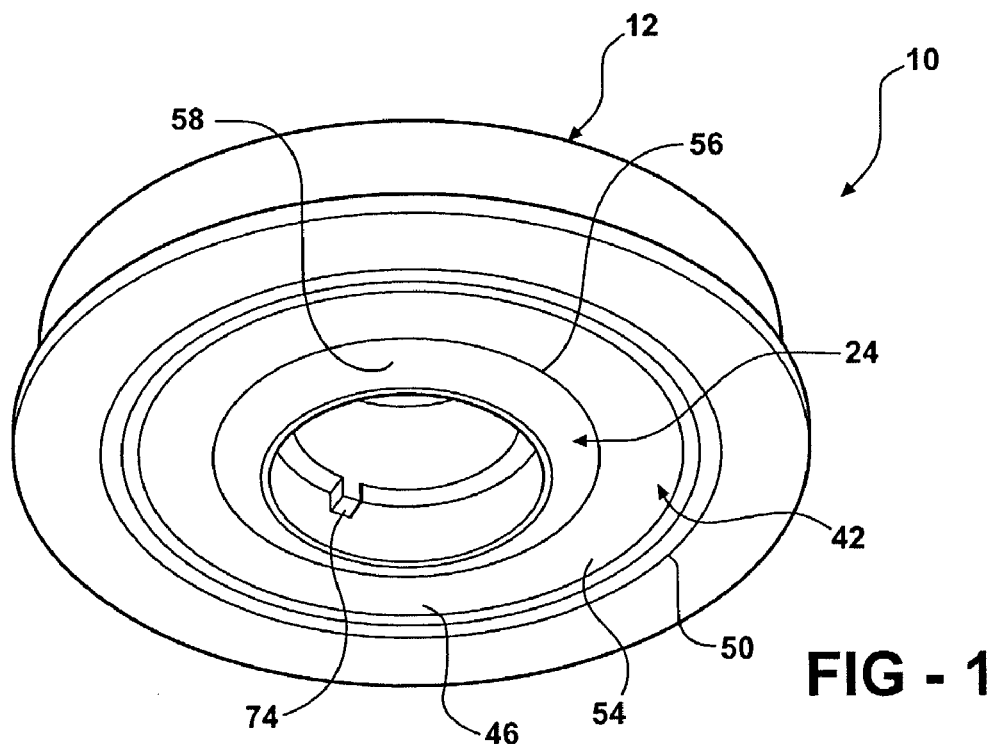
FIG. 1 is a perspective view of a joint assembly constructed according to a first presently preferred embodiment of the invention.

The joint assembly 10 has a dynamic lip seal device 42 which is fixed to one of the joint members and slideably and sealably engages the other of the joint members to provide a sealed environment to the balls 32. As best shown in FIGS. 1–3, the seal device 42 preferably comprises a pair of separate, annular seal elements 44,46 which are fixed to the outer joint member 12 at their opposite axial ends 18,20 in axially spaced relation to one another. As shown best in FIGS. 2 and 3, the seal elements 44,46 may each include an outer peripheral mounting flange 48 accommodated within an annular ring groove 50 formed in each end face 18,20 of the outer joint member 12 and in which a retaining ring 52 is disposed for securing the sealing elements 44,46 to the outer joint member 12. While this is one way of securing the seal elements 44,46 stationarily to the outer joint member 12, it will be appreciated in the invention contemplates other ways of fixing the seal elements 44,46 to the outer joint member 12, such as other means of clamping or bonding the seal elements 44,46.

The seal elements 44,46 each have generally flat, annular bodies 54 extending radially inwardly of the mounting flange 48 across the open ends of the ball tracks 30 and terminate in annular seal lips 56 which slideably, sealably engage associated sealing surface 58 of the inner joint member 24, so as to define a sealed space 60 between the spaced seal elements 44,46 in which the balls 32 are housed to protect them from exposure to the environment outside of the seal 42 at all angles of the joint assembly 10. As the joint members 12,14 angulate about the center point C, the seal lips 56 slide across and maintain sealing contact with the associates sealing surfaces 58 of the inner joint member so as to maintain a sealed environment for the balls 32. Within the sealed space 60, a lubricant 62 such as grease is provided and is maintained within the space through provision of the seal elements 44,46. The dynamic wiping action of the seal lips 56 on the seal surfaces 58 actively wipes and maintains the lubricant 62 within the sealed space 60.

According to the first embodiment, the sealing surfaces 58 of the inner joint member 24 are provided on a pair of sealing shoulders 64 of the inner joint member 24. The sealing shoulders 64 are provided on axially opposite ends of the inner joint member 24 adjacent the ball grooves 28 and associated lands. The sealing shoulders 64 are spaced from one another and are preferably convex in shape, and still further preferably are part-spherical and have a center of curvature coinciding with the center C of the joint assembly 10. The annular seal lips 56 of the seal elements 44,46 are fabricated preferably of a pliant, resilient material such as rubber or the like which can sustain exposure to the lubricant 62 and to the external environment while maintaining sufficient sealing contact with the sealing surfaces 58 of the inner joint member 24 so as to maintain the lubricant 62 within the sealed space 60 and to keep contaminants such as dust, dirt, moisture and the like from entering the sealed space 60 from the environment external to the seal 42. The sealing shoulders 64 and associated sealing surfaces 58 are disposed radially inwardly of the ball grooves 28 and lands of the inner joint member 24 according to the first embodiment. The seal elements 44,46 do not extend radially outwardly of an outer-most surface 66 of the outer joint member 12, and thus the seal device 42 does not enlarge the radial package size of the joint assembly 10 beyond that determined by the size of the outer joint member. The lip seal device 42 is also compact in the axial direction.

Figure 4:
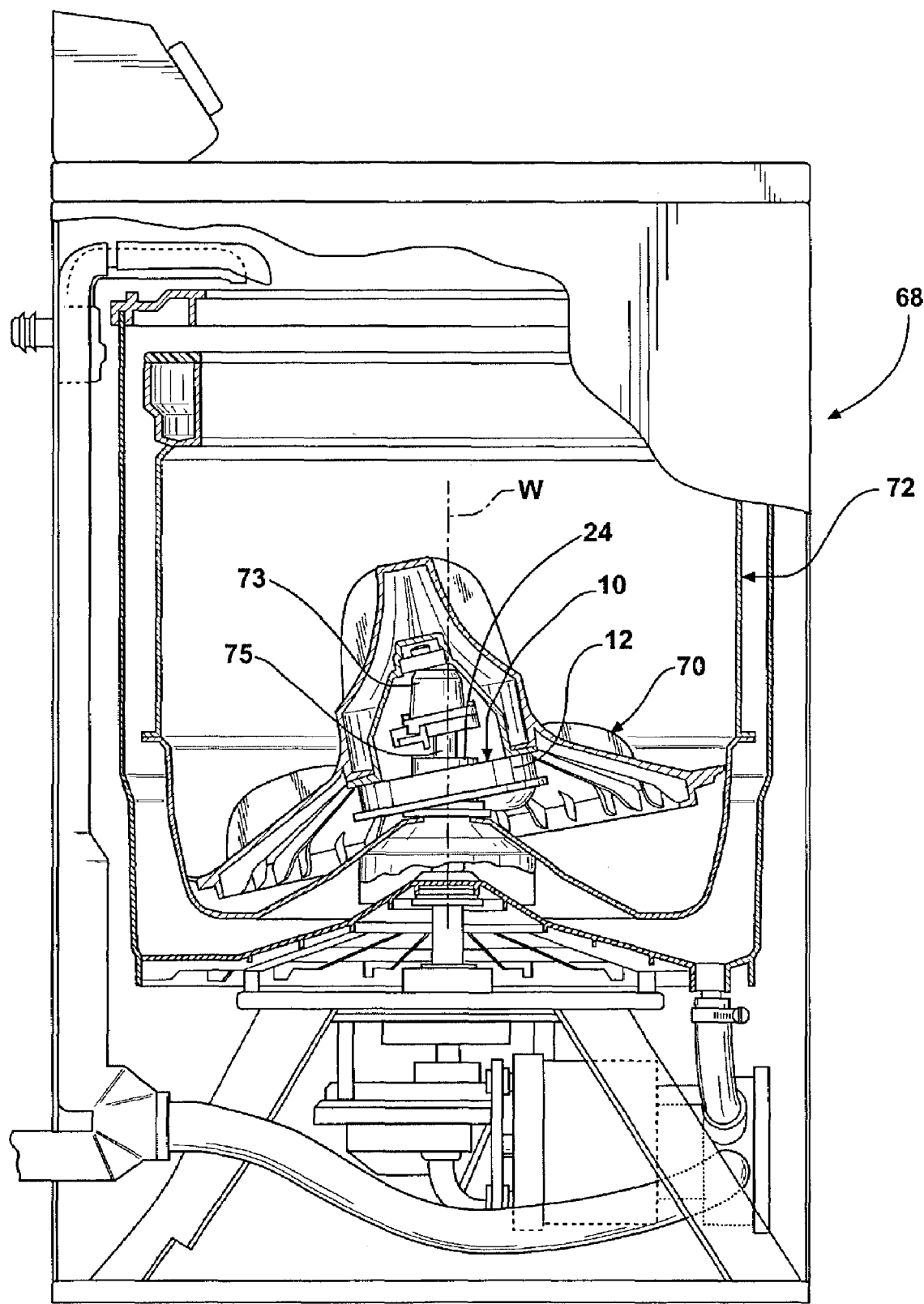
FIG. 4 is an elevational view, shown partly broken away and in section, of a wobble plate washing machine equipped with a joint assembly according to the invention.

FIG. 4 shows the joint assembly 10 installed in a washing machine 68 of the type disclosed in U.S. Pat. No. 6,115,863 in which a wash plate 70 is supported within a wash drum 72 and driven by a wobble drive 73 for gyrating, wobbling action of the work plate 70 about a wobble axis W. The joint assembly 10 of the present invention operates in substitution of the three piece nested joint disclosed in the aforementioned U.S. Pat. No. 6,115,863, with the inner joint member 24 mounted stationarily on a spindle and the outer joint member 12 mounting the wash plate 70 such that is angulates with the same wobbling action imparted to the wash plate 70 relative to the inner joint member 24, all the while maintaining a sealed, lubricated space 60 for the balls 32 by provision of the seal device 42. The construction and operation of such wobble plate wash machines 68 is described in the aforementioned U.S. Pat. No. 6,115,863, the disclosure of which is incorporated herein by reference. The inner joint member 24 preferably has one or more inwardly projecting tabs or ribs 74 which engage associated slots or shoulders (not shown) of the spindle 75 of the wash machine to secure the inner joint member 24 against rotation and may be further fixed axially by means of retaining rings or the like. The wash plate 70 may be fixed to the outer joint member 12 in the manner described in the aforementioned U.S. Pat. No. 6,115,863 by means of fasteners disposed in associated bolt holes 76 of the outer joint member 12.

Figure 5:
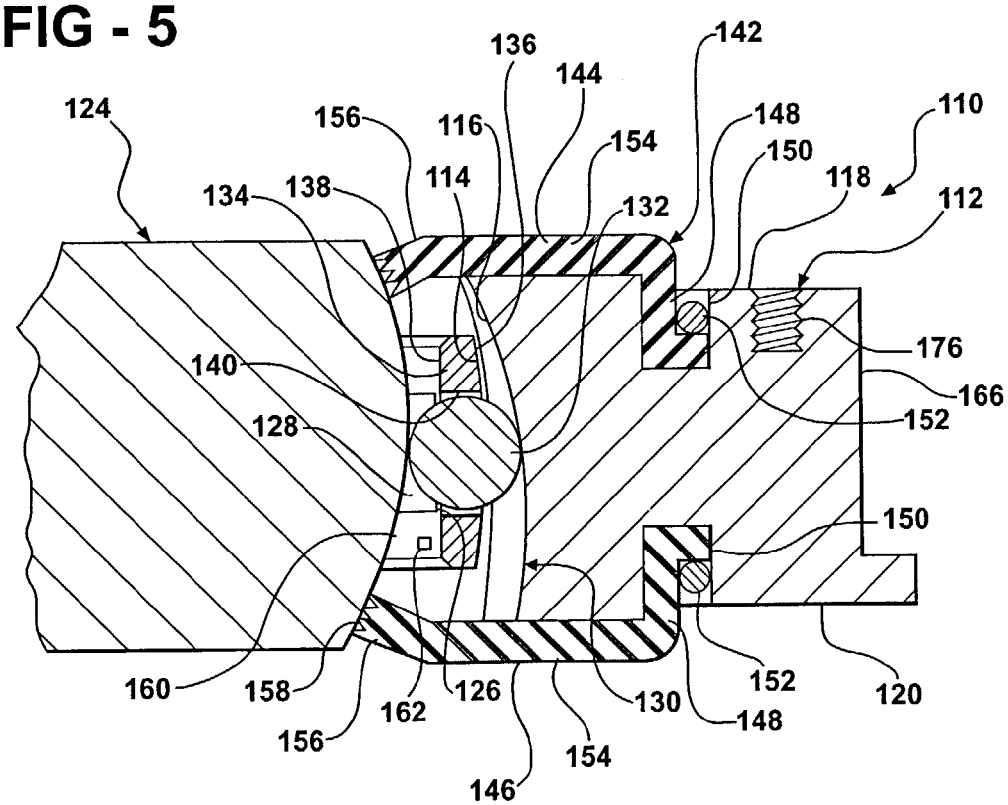
FIG. 5 is a fragmentary sectional view of a joint assembly constructed according to an alternative embodiment of the invention.

FIG. 5 shows an alternative embodiment of a joint assembly 110, wherein the same reference numerals are used to designate like features to that of the first embodiment, but are offset by 100. The joint assembly 110 differs from that of the joint assembly 10 of the first embodiment in that the seal lips 156 of the seal elements 144,146 of the seal device 142 are configured to dynamically engage and wipe against the ball grooves 128 and lands of the inner joint members 124 to provide the dynamic sealing action between the outer 112 and inner 124 joint members to define the sealed space 160. As such, the sealing surfaces 158 of the inner joint member 124 are provided by the grooves 128 and lands. The second embodiment preferably omits the sealing shoulders 64. The remaining features and operation of the joint assembly 110 are otherwise the same.

FIG. 6 shows still a further embodiment of the invention which is similar to the first embodiment except that in lieu of the ball grooves and balls, the joint assembly 10 has interfitting guides and grooves which engage to enable relative angulation while supporting the inner and outer joint members substantially against relative rotation. One such type of interfitting structure of the outer and inner joint members which allows for relative angulation while substantially supporting the members against relative rotation is shown in FIG. 6. In this particular embodiment, the outer joint member 212 carries a set of pins 90 which extend radially inwardly from the concave inner surface 91 of the outer race 212 into a groove or channel 92 of the inner race 224. The pins 90 mount rollers 93 which ride in the grooves 92 (only one side of grooves shown) that enables the outer joint part 212 to angulate in the direction of arrow K during which the rollers 93 travel along the grooves 92, and further angulate in the direction of arrow M about the axis of the pins 90, while being held by the interference between the rollers 93 and walls of the grooves 90 substantially against relative rotation about the central longitudinal axis of the inner joint member 224.

The outer joint member 212 carries a similar seal device 242 as that of the previous embodiments which wipe against shoulders of the inner race 224 adjacent the grooves 92 as before. It will be understood, however, that while this and the previous embodiments show two sets of seals (242,246 in FIG. 6), the invention contemplates there being only one such wiping seal element, with the opposite side being either open or sealed by another means, such as connecting the outer joint member 212 to another component which would serve to close off the open end of the joint. Accordingly, it is understood that in all of the embodiments shown, the scope of the seal device is not limited to requiring a pair of annular wiping seal elements, but could include only one, or more than three if called for. In a broad sense, the objective of the present seal system is to eliminate the need for a conventional convoluted boot by fitting one or the other joint members with one or more seal elements which wipingly engage the other element to provide a seal across the inner face thereof.

In keeping with the broad objectives of the invention, another embodiment is shown in FIG. 7 in the form of a standard Rzeppa-type joint which are normally fitted with a convoluted boot seal which protects the interior of the joint from contamination by the external environment and from the loss of lubricant. In place of the convoluted boot, the Rzeppa joint of FIG. 7 is fitted with a dynamic seal device 342 (single seal element) which is fixed to the outer joint member 312 and wipes against a shoulder 358 of the inner joint member 324 during angulation of the joint to maintain a seal at the interface of the seal 342 and sealing surface 358. The opposite end of the joint is closed by the outer joint member which is normally unitized with it shaft as shown. Accordingly, FIG. 7 represents an embodiment of a constant velocity fixed center joint of the type normally used in front wheel drive applications of automotive vehicles which is fitted with the dynamic wiping seal device 342 of the invention in lieu of the standard convoluted boot seal.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A joint assembly comprising:
an outer joint member having a concave inner surface and at least one concavely curved ball groove formed in said inner surface;
an inner joint member supported in said outer joint member for relative angular movement of said inner and outer members, said inner joint member having a convex outer surface and at least one convexly curved ball groove formed in said outer surface and aligned with said at least one ball groove of said inner surface to provide a corresponding at least one curved ball track;
at least one ball rollingly disposed in said at least one ball track for permitting said relative angular movement of said inner and outer joint members while supporting said inner and outer joint members against relative rotation; and
a dynamic seal device fixed to said outer joint member and slideably and sealably engaging at least one associated sealing surface of said inner joint member during said relative angular movement of said inner and outer joint members to provide a sealed environment to said at least one ball;
wherein said seal device has at least one annular seal lip.

2. A joint assembly comprising:
an outer joint member having a concave inner surface and at least one concavely curved ball groove formed in said inner surface;
an inner joint member supported in said outer joint member for relative angular movement of said inner and outer members, said inner joint member having a convex outer surface and at least one convexly curved ball groove formed in said outer surface and aligned with said at least one ball groove of said inner surface to provide a corresponding at least one curved ball track;
at least one ball rollingly disposed in said at least one ball track for permitting said relative angular movement of said inner and outer joint members while supporting said inner and outer joint members against relative rotation; and
a dynamic seal device fixed to said outer joint member and slideably and sealably engaging at least one associated sealing surface of said inner joint member during said relative angular movement of said inner and outer joint members to provide a sealed environment to said at least one ball;
wherein said seal device comprises at least a pair of sealing elements axially spaced from one another along a longitudinal axis of said outer joint member.

3. The assembly of claim 2 wherein said sealing elements are mounted on said outer joint member on opposite sides of said at least one ball.

4. The assembly of claim 3 wherein said seal elements have annular seal lips engaging said at least one associated sealing surface of said inner joint member.

5. The assembly of claim 4 wherein said inner joint member includes a pair of sealing shoulders disposed on axially opposite sides of said at least one ball groove of said inner joint member.

6. The assembly of claim 5 wherein said at least one sealing surface comprises a pair of sealing surfaces disposed on said sealing shoulders.

7. The assembly of claim 6 wherein said sealing shoulders extend radially inwardly of said at least one ball groove.

8. The assembly of claim 6 wherein said sealing surfaces are convexly shaped.

9. The assembly of claim 6 wherein said sealing surfaces are part-spherical in shape.

10. The assembly of claim 4 wherein said at least one sealing surface is provided by said at least one ball groove.

11. A joint assembly comprising:
an outer joint member having a concave inner surface and at least one concavely curved ball groove formed in said inner surface;
an inner joint member supported in said outer joint member for relative angular movement of said inner and outer members, said inner joint member having a convex outer surface and at least one convexly curved ball groove formed in said outer surface and aligned with said at least one ball groove of said inner surface to provide a corresponding at least one curved ball track;
at least one ball rollingly disposed in said at least one ball track for permitting said relative angular movement of said inner and outer joint members while supporting said inner and outer joint members against relative rotation;
a dynamic seal device fixed to said outer joint member and slideably and sealably engaging at least one associated sealing surface of said inner joint member during said relative angular movement of said inner and outer joint members to provide a sealed environment to said at least one ball; and
a ball cage disposed between said inner and outer joint members;
wherein said ball cage includes a convex outer surface engaging said concave inner surface of said outer joint member, and a concave inner surface engaging said convex outer surface of said inner joint member.

12. A joint assembly comprising:
an outer joint member having a concave inner surface and at least one curved ball groove formed in said inner surface;
an inner joint member supported in said outer joint member for relative angular movement of said inner and outer members, said inner joint member having a convex outer surface and at least one curved ball groove formed in said outer surface and aligned with said at lest one ball groove of said inner surface to provide a corresponding at least one curved ball track;
at least one ball rollingly disposed in said at least one ball track for permitting said relative angular movement of said inner and outer joint members while supporting said inner and outer joint members against relative rotation; and
a dynamic seal device fixed to said outer joint member and slideably and sealably engaging associated sealing surfaces of said inner joint member during said relative angular movement of said inner and outer joint members on opposite sides of said at least one ball to provide a sealed environment to said at least one ball.

13. A joint assembly comprising:
an outer joint member having a concave inner surface and at least one curved ball groove formed in said inner surface;
an inner joint member supported in said outer joint member for relative angular movement of said inner and outer members, said inner joint member having a convex outer surface and at least one curved ball groove formed in said outer surface and aligned with said at lest one ball groove of said inner surface to provide a corresponding at least one curved ball track;
at least one ball rollingly disposed in said at least one ball track for permitting said relative angular movement of said inner and outer joint members while supporting said inner and outer joint members against relative rotation;
a ball cage disposed between said inner and outer joint members;
a dynamic seal device fixed to said outer joint member and slideably and sealably engaging at least one associated sealing surfaces of said inner joint member during said relative angular movement of said inner and outer joint members on opposite sides of said ball cage.

14. A joint assembly comprising:
an outer joint member having a concave inner surface;
an inner joint member supported in said outer joint member for relative angular movement of said inner and outer members, said inner joint member having a convex outer surface;
at least one rolling element supported between said inner and outer joint members for permitting said relative angular movement while supporting said inner and outer joint members against relative rotation; and
a dynamic seal device fixed to said outer joint member and slideably and sealably engaging at least one associated sealing surfaces of said inner joint member during said relative angular movement of said inner and outer joint members on opposite sides of said at least one rolling element to provide a sealed environment to said at least one rolling element.

* * * * *